US012617326B2

(12) United States Patent
Logan, Jr. et al.

(10) Patent No.: US 12,617,326 B2
(45) Date of Patent: May 5, 2026

(54) VEHICLE SEAT COMPONENT INCLUDING INTEGRATED ASSIST HANDLE

(71) Applicant: GM Global Technology Operations LLC, Detroit, MI (US)

(72) Inventors: James Logan, Jr., South Lyon, MI (US); Stefano A. Moraccini, Macomb, MI (US); Jeff E. Nasca, Bloomfield Township, MI (US); Michael Apone, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 18/323,736

(22) Filed: May 25, 2023

(65) Prior Publication Data

US 2024/0391373 A1 Nov. 28, 2024

(51) Int. Cl.
*B60N 3/02* (2006.01)
*B60N 2/879* (2018.01)

(52) U.S. Cl.
CPC .............. *B60N 3/02* (2013.01); *B60N 2/879* (2018.02)

(58) Field of Classification Search
CPC .................................. B60N 2/879; B60N 3/02
See application file for complete search history.

(56) References Cited

U.S. PATENT DOCUMENTS

| | | | | | |
|---|---|---|---|---|---|
| 4,422,691 A | * | 12/1983 | Vogel | .................... | B60N 2/686 |
| | | | | | 297/232 |
| 2005/0178910 A1 | | 8/2005 | Sprenger | | |

FOREIGN PATENT DOCUMENTS

| | | | | | |
|---|---|---|---|---|---|
| CN | 201544974 U | * | 8/2010 | | |
| CN | 103661034 A | * | 3/2014 | | |
| CN | 210912131 U | * | 7/2020 | | |
| DE | 102008047692 A1 | * | 3/2010 | .............. | B60N 3/02 |
| EP | 0167680 A2 | * | 1/1986 | ............. | B60N 2/879 |
| JP | S59177355 U | * | 11/1984 | | |
| JP | S647075 Y2 | * | 2/1989 | | |
| JP | 2003072443 A | * | 3/2003 | ............. | B60N 3/023 |
| JP | 2012240620 A | * | 12/2012 | | |
| KR | 19980012530 U | * | 6/1998 | .............. | B60N 3/02 |
| KR | 19980038816 U | * | 9/1998 | ............. | B60N 2/879 |
| PL | 202099 B1 | * | 6/2009 | | |

OTHER PUBLICATIONS

German Office Action for German Application No. 102023128639. 0; dated May 14, 2025; 4 pages.

* cited by examiner

*Primary Examiner* — Aaron L Lembo
(74) *Attorney, Agent, or Firm* — CANTOR COLBURN LLP

(57) ABSTRACT

A seat component includes a body having a first surface, a second surface opposite the first surface, a first side surface, and a second side surface. The first side surface and the second side surface extend between and connect the first surface and the second surface. A recess is formed in one of the first side surface and the second side surface. An assist handle is secured to the seat component at the recess.

20 Claims, 5 Drawing Sheets

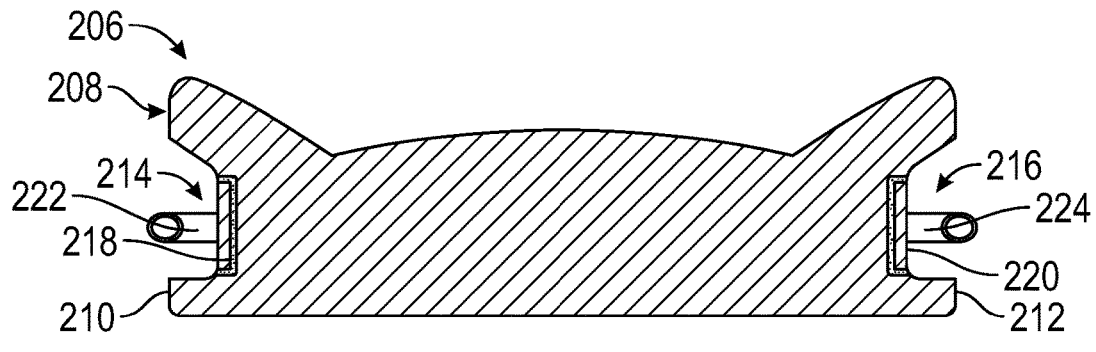
FIG. 9
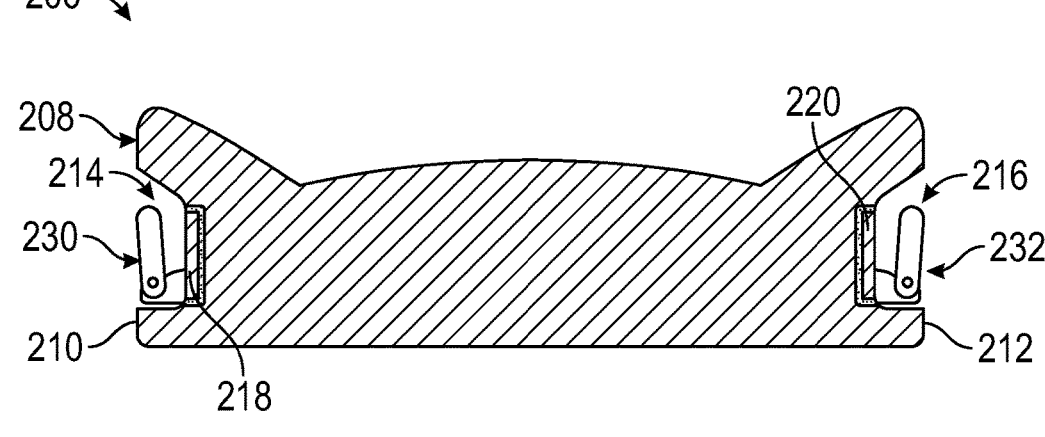
FIG. 10
FIG. 11

VEHICLE SEAT COMPONENT INCLUDING INTEGRATED ASSIST HANDLE

INTRODUCTION

The subject disclosure relates to the art of seat components and, more particularly, to a seat component for a vehicle having an integrated assist handle.

Most passenger vehicles include fixed assist handles that may be used by passengers to aide in getting into and out of the vehicle. The handles are typically mounted along a door frame. The location of the assist handle(s) varies and may depend on various factors including seat configuration, door frame structure, vehicle trim level, and the like. In addition to factory mounted assist handles which are fixedly mounted to the vehicle, there exist after-market assist handles that interact with door latch features. After the door is opened, the after-market assist handle is temporarily inserted into the door latch feature and provides a support surface that may aid a passenger in egressing from the vehicle.

Unfortunately, many users find the position of the assist handle to be impractical for their particular needs. The handle may be too far forward, may not be arranged to help someone from a rear seat, or may be otherwise out of reach. If not in a convenient location for the user, the assist handle may not be utilized. In such a case, the user may find it difficult to get into or out from the vehicle. When existing assist or grab handles are inconvenient, many users will pull on a seatback or a headrest to assist with alighting from the vehicle. Seatbacks and headrests are not designed to withstand use as a handle. Accordingly, it is desirable to provide an assist handle that is built into and attached to load bearing structure of a seat component designed to withstand such stresses and be used by passengers as an aid in alighting from the vehicle.

SUMMARY

A seat component, in accordance with a non-limiting example, includes a body having a first surface, a second surface opposite the first surface, a first side surface, and a second side surface. The first side surface and the second side surface extend between and connect the first surface and the second surface. A recess is formed in one of the first side surface and the second side surface. An assist handle is secured to the seat component at the recess.

In addition to one or more of the features described herein the recess includes a perimetrical surface element defining the assist handle.

In addition to one or more of the features described herein the recess includes a first recess including a first perimetrical surface element mounted in the first side surface and a second recess including a second perimetrical surface element mounted in the second side surface, the first perimetrical surface element forming a first assist handle and the second perimetrical surface element forming a second assist handle.

In addition to one or more of the features described herein the first assist handle is fixedly connected to the second assist handle through the body.

In addition to one or more of the features described herein the recess includes a base surface surrounded by a perimetrical surface including an upper surface portion, a lower surface portion, a first side surface portion, and a second side surface portion, the assist handle being fixedly connected to the perimetrical surface.

In addition to one or more of the features described herein the assist handle includes a first end extending through the upper surface portion and a second end extending through the base surface.

In addition to one or more of the features described herein the assist handle is spaced from the base surface, the first side surface portion, and the second side surface portion.

In addition to one or more of the features described herein the recess includes a base surface surrounded by a perimetrical surface including an upper surface portion, a lower surface portion, a first side surface portion, and a second side surface portion, the assist handle being connected to the base surface.

In addition to one or more of the features described herein the assist handle is pivotally mounted to the base surface.

In addition to one or more of the features described herein the body defines a headrest.

A vehicle, in accordance with a non-limiting example, includes a vehicle body defining a passenger compartment and a seat arranged in the passenger compartment. The seat includes a seat component including a body having a first surface, a second surface opposite the first surface, a first side surface, and a second side surface. The first side surface and the second side surface extend between and connect the first surface and the second surface. A recess is formed in one of the first side surface and the second side surface. An assist handle secured to the seat component at the recess.

In addition to one or more of the features described herein the recess includes a perimetrical surface element defining the assist handle.

In addition to one or more of the features described herein the recess includes a first recess including a first perimetrical surface element mounted in the first side surface and a second recess including a second perimetrical surface element mounted in the second side surface, the first perimetrical surface element forming a first assist handle and the second perimetrical surface element forming a second assist handle.

In addition to one or more of the features described herein the first assist handle is fixedly connected to the second assist handle through the body.

In addition to one or more of the features described herein the recess includes a base surface surrounded by a perimetrical surface including an upper surface portion, a lower surface portion, a first side surface portion, and a second side surface portion, the assist handle being fixedly connected to the perimetrical surface.

In addition to one or more of the features described herein the assist handle includes a first end extending through the upper surface portion and a second end extending through the base surface.

In addition to one or more of the features described herein the assist handle is spaced from the base surface, the first side surface portion, and the second side surface portion.

In addition to one or more of the features described herein the recess includes a base surface surrounded by a perimetrical surface including an upper surface portion, a lower surface portion, a first side surface portion, and a second side surface portion, the assist handle being connected to the base surface.

In addition to one or more of the features described herein the assist handle is pivotally mounted to the base surface.

In addition to one or more of the features described herein the seat component defines a headrest.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 9 is a top sectional view of a seat back including a fixed integrated assist handle, in accordance with a non-limiting example;

FIG. 10 is a top sectional view of a seat back including a folding integrated assist handle shown in a stowed configuration, in accordance with a non-limiting example; and FIG. 11 is a top sectional view of a seat back including a folding integrated assist handle shown in a deployed configuration, in accordance with a non-limiting example.

DETAILED DESCRIPTION

Figure 1:
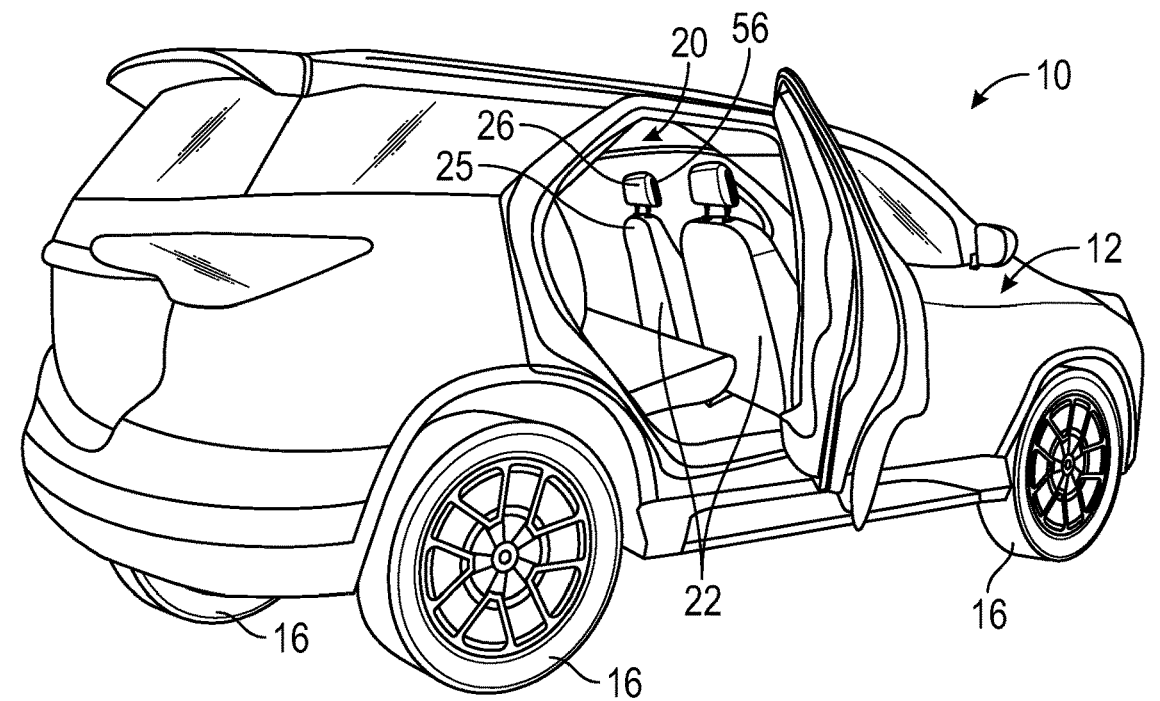
FIG. 1 is a left side view of a vehicle including a seat component having an integrated assist handle, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a vehicle body 12 supported on a plurality of wheels 16. Vehicle body 12 defines a passenger compartment 20 within which is mounted one or more seats 22. Seat 22 is formed from multiple seat components including a seat back 25 and a headrest 26 mounted to seat back 25.

Figure 2:
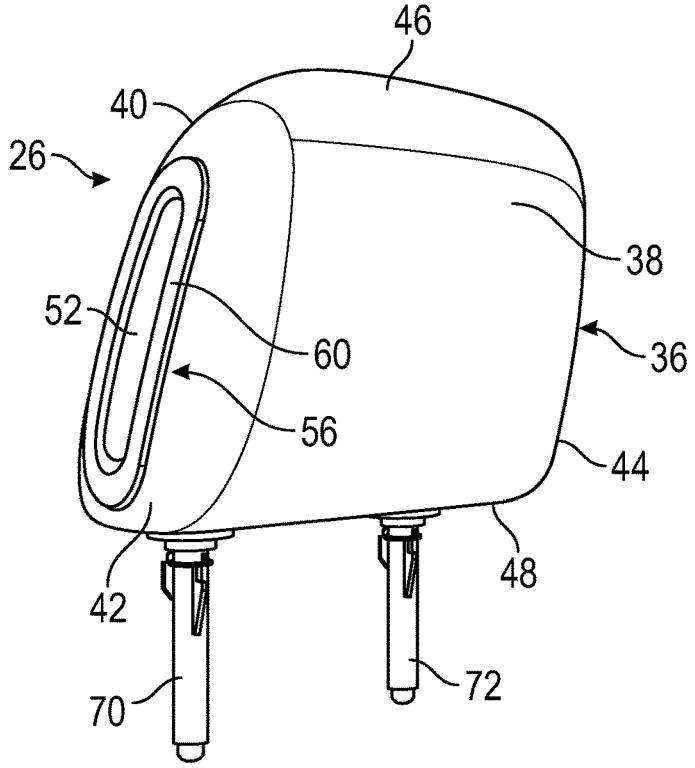
FIG. 2 is a right front perspective view of a seat headrest including an integrated assist handle, in accordance with a non-limiting example.
Figure 3:
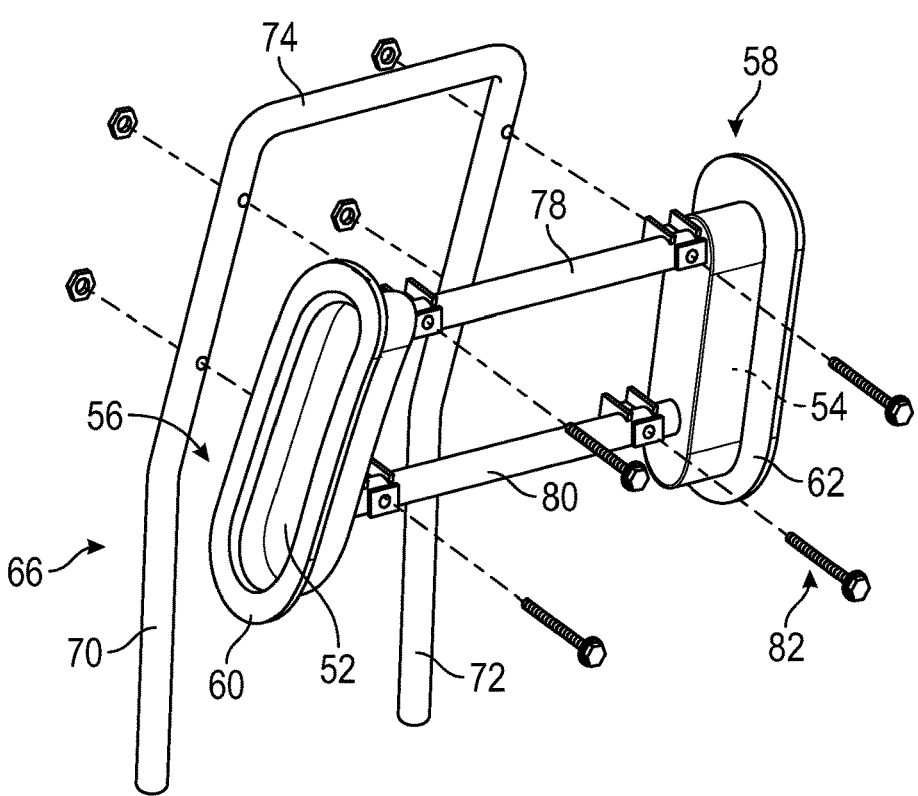
FIG. 3 is a disassembled view of the integrated assist handle of FIG. 2, in accordance with a non-limiting example.

Referring to FIG. 2, headrest 26 includes a body 36 having a first surface 38, a second surface 40, a first side surface 42, and a second side surface 44. First surface 38 defines a forward facing surface (not separately labeled) and second surface 40 defines a rearward facing surface (also not separately labeled). Body 36 also includes a top surface 46 and a bottom surface 48. In a non-limiting example, a first recess 52 is defined in first side surface 42 and a second recess 54 is defined in second side surface 44 as shown in FIG. 3. A first assist handle 56 is arranged at first recess 52 and a second assist handle 58, FIG. 3, is arranged at second recess 54. In a non-limiting example, first recess 52 and second recess 54 include a depth of pocket dimension that is sized to provide a positive gripping structure for hand and/or fingers of a passenger.

In accordance with a non-limiting example, first assist handle 56 includes a first perimetrical surface element 60 and second assist handle 58 includes a second perimetrical surface element 62. First perimetrical surface element 60 and second perimetrical surface element 62 are arranged about corresponding ones of first recess 52 and second recess 54. First perimetrical surface element 60 and second perimetrical surface element 62 provide structure that is engaged by a passenger to aid in getting into and/or out from vehicle 10. By providing structure in or at each recess, wear and tear of headrest 26 may be reduced.

Referring to FIG. 3, headrest 26 includes an internal support structure 66 shown in the form of a first support member 70 and a second support member 72. First support member 70 and second support member 72 project through bottom surface 48, FIG. 2, and extend into seat back 25, FIG. 1. A connector member 74 joins first support member 70 and second support member 72. Additional structural support is provided by connecting first perimetrical surface element 60 and second perimetrical surface element 62 with a first cross member 78 and a second cross member 80. First cross member 78 and second cross member 80 are connected to first support member 70 and second support member 72 by a plurality of mechanical fasteners indicated generally at 82.

Figure 4:
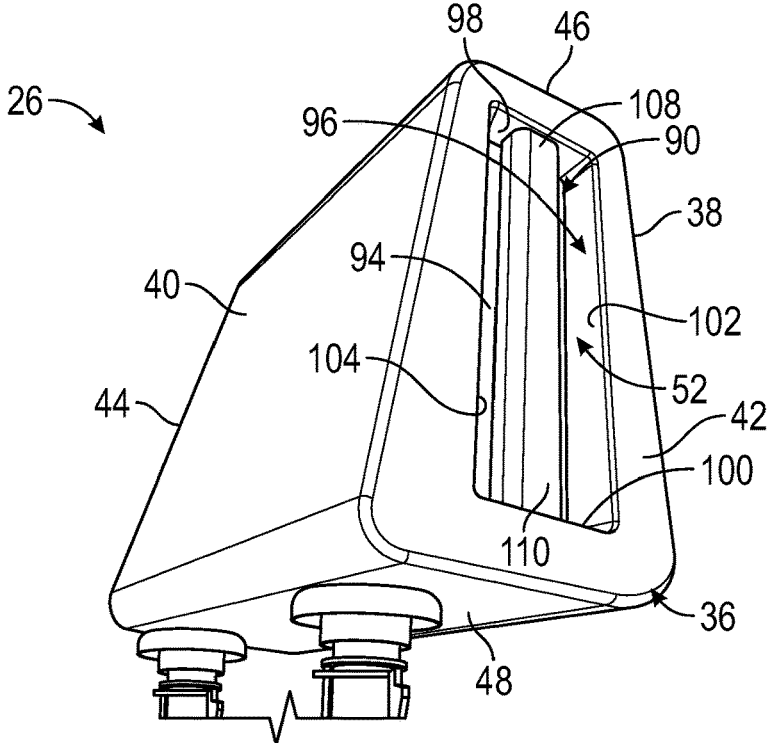
FIG. 4 is a right rear perspective view of a seat headrest including an integrated assist handle, in accordance with another non-limiting example.
Figures 5, 6:
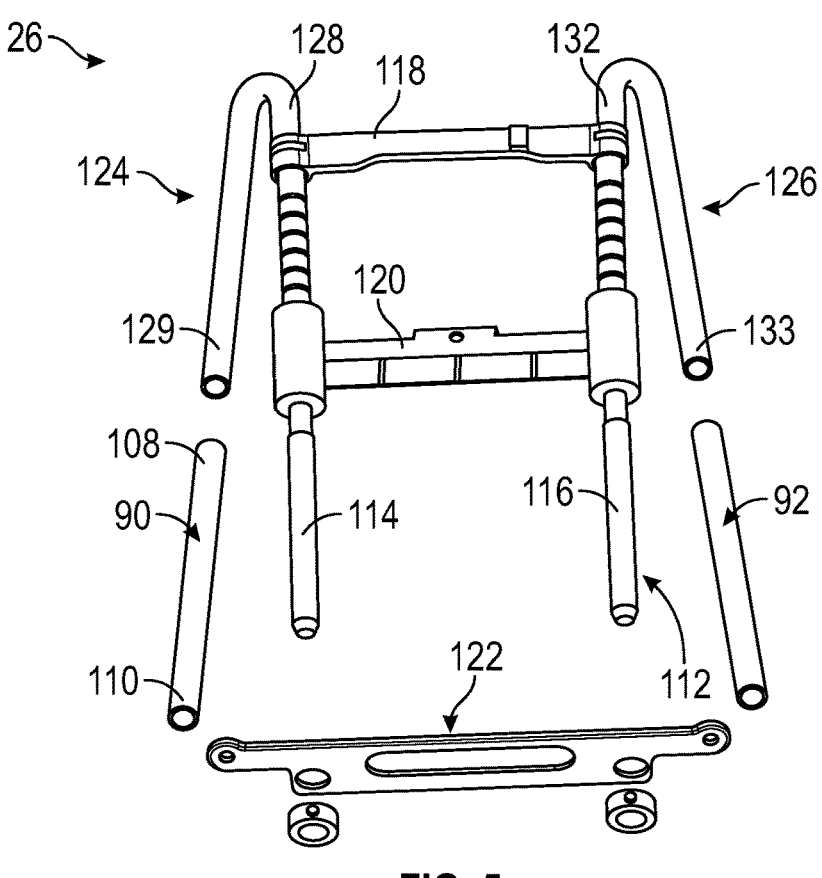
FIG. 5 is a disassembled view of the integrated assist handle of FIG. 4, in accordance with a non-limiting example.
FIG. 6 is a right rear perspective view of a seat headrest including a folding integrated assist handle in a deployed configuration, in accordance with another non-limiting example.

Reference will now follow to FIGS. 4 and 5 in describing headrest 26 in accordance with another non-limiting example. Headrest 26 includes a first assist handle 90 arranged in first recess 52. Headrest 26 also includes a second assist handle 92, (FIG. 5). Second assist handle 92 is arranged in a second recess (not shown) formed in second side surface 44 of headrest 26. First recess 52 includes a base surface 94 and a perimetrical surface 96. Perimetrical surface 96 includes an upper surface portion 98, a lower surface portion 100, a first side surface portion 102, and a second side surface portion 104. It should be understood that second recess 54 includes similar structure.

In a non-limiting example, first assist handle 90 includes a first end 108 and a second end 110. First end 108 extends into upper surface portion 98 of perimetrical surface 96 and second end 110 extends into lower surface portion 100 of perimetrical surface 96. First assist handle 90 and second assist handle 92 are mounted to support structure 112, FIG. 5, arranged in headrest 26. Support structure 112 includes a first support member 114 and a second support member 116 joined by a first connector 118 and a second connector 120. First support member 114 and second support member 116 extend through bottom surface 48 of headrest 26 into seat back 25. Support structure 112 also includes an assist handle support 122 that extends between and connects first support member 114 and second support member 116. Assist handle support 122 also connects with first assist handle 90 and second assist handle 92 is arranged at bottom surface 48 of headrest 26.

In a non-limiting example, support structure 112 also includes a first assist handle support member 124 connected to first support member 114 and a second assist handle support member 126 connected to second support member 116. First assist handle support member 124 includes a first end 128 connected to first support member 114 and a second end 129 that connects with assist handle support 122. First assist handle 90 is fitted as a sleeve over first assist handle support member 124. Similarly, second assist handle support member 126 includes a third end 132 connected to second support member 116 and a fourth end 133 that connect to assist handle support 122. Second assist handle 92 is fitted, as a sleeve, over second assist handle support 126. With this arrangement, each of the first assist handle 90 and the second assist handle 92 is spaced from internal surfaces of corresponding ones of first recess 52 and second recess 54 to promote gripping by a user.

Figure 7:
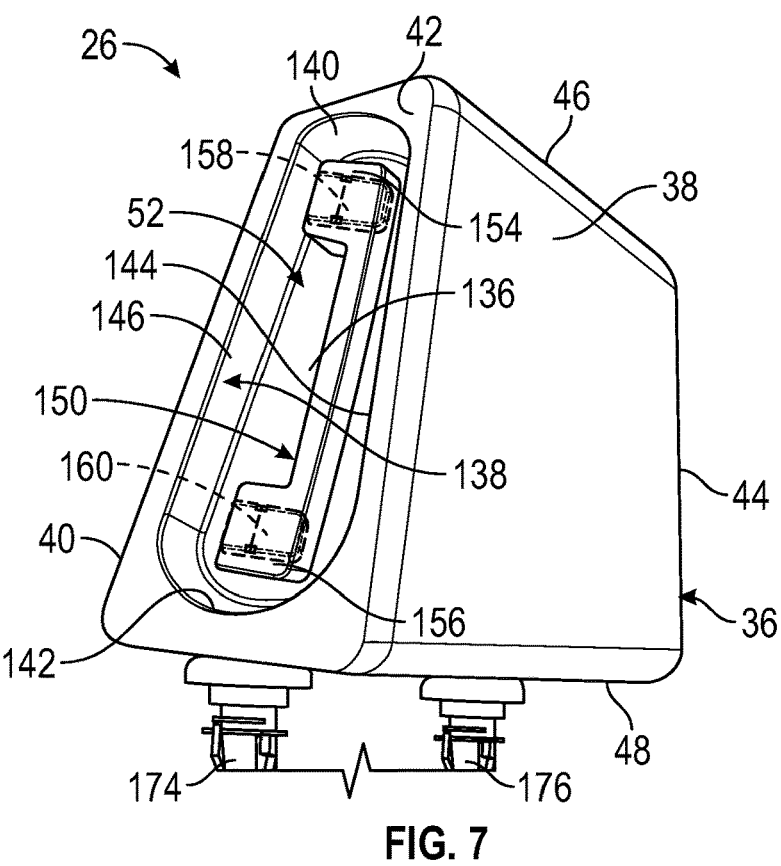
FIG. 7 is a right rear perspective view of a seat headrest including a folding integrated assist handle in a stowed configuration, in accordance with another non-limiting example.
Figure 8:
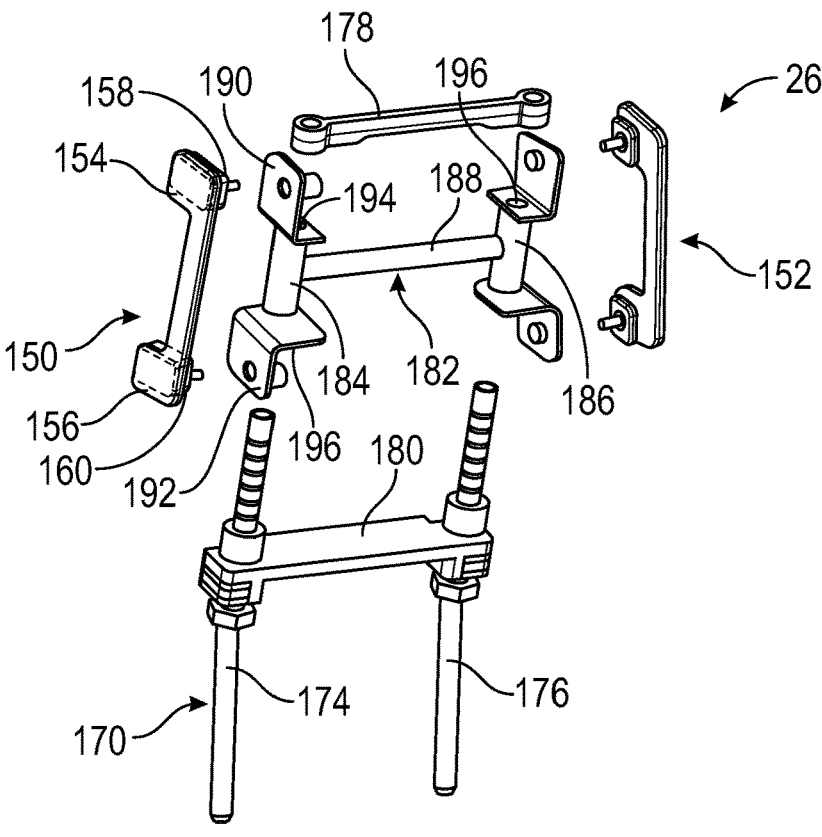
FIG. 8 is a disassembled view of the integrated assist handle of FIG. 7, in accordance with a non-limiting example.

Reference will now follow to FIGS. 6, 7, and 8 in describing headrest 26 in accordance with another non-limiting example. In the non-limiting example shown in FIGS. 6 and 7, first recess 52 includes a base surface 136 and a perimetrical surface 138 including an upper surface portion 140, a lower surface portion 142, a first side surface portion 144, and a second side surface portion 146. In a non-limiting example, a first assist handle 150 is mounted to base surface 136 and a second assist handle 152, FIG. 8, is mounted in a second recess (not shown) formed in second side surface 44 of headrest 26. Reference will now follow describing first assist handle 150 with an understanding that second assist handle 152 includes similar structure.

First assist handle 150 includes a first end 154 and a second end 156. First end 154 is coupled to base surface 136 through a first connector 158 and second end 156 is coupled to base surface 136 through a second connector 160. First assist handle 150 and second assist handle 152 may be fixedly mounted headrest 26. In another non-limiting example, first connector 158 and second connector 160 may define hinges (not separately labeled) that allow first assist handle 150 to pivot relative to base surface 136 as shown in FIG. 6. Second assist handle 152 would include similar structure.

First assist handle 150 as shown in FIG. 8, and second assist handle 152 are mounted to support structure 170, arranged in headrest 26. Support structure 170 includes a first support member 174 and a second support member 176 joined by a first connector 178 and a second connector 180. First support member 174 and second support member 176 extend through bottom surface 48 of headrest 26 into seat back 25. Support structure 170 also includes an assist handle support 182 arranged between first connector 178 and second connector 180. Support structure 170 also extends between and connects first support member 174 and second support member 176.

In a non-limiting example, assist handle support 182 includes a first support element 184 connected to a second support element 186 through a cross support element 188. First support element 184 includes a first handle support surface 190 and a second handle support surface 192. First support element 184 also includes a first support member guide 194 and a second support member guide 196. First support member guide 194 defines a first passage (not separately labeled) that extends through first support element 184. Second support member guide 196 defines a second passage (also not separately labeled) that extends through second support element 186. First support member 174 extends through first support member guide 194 and second support member 176 extends through second support member guide 196 to enhance structural support for first assist handle 50.

Reference will now follow to FIG. 9 in describing a seat component in the form of a seat back 206 in accordance with a non-limiting example. Seat back 206 includes a seat back body 208 having a first side surface 210 and a second side surface 212. Second side surface 212 is opposite to first side surface 210. A first recess 214 is formed in first side surface 210 and a second recess 216 is formed in second side surface 212. First recess 214 includes a first base surface 218 and second recess 216 includes a second base surface 220. In a non-limiting example, first recess 214 and second recess 216 include a depth of pocket dimension that is sized to provide a positive gripping area for hand and/or fingers of a passenger. In a non-limiting example, a first assist handle 222 is mounted to first base surface 218 and a second assist handle 224 is mounted to second base surface 220. In the non-limiting example shown in FIG. 9, first assist handle 222 and second assist handle 224 are fixedly mounted to first base surface 218 and second base surface 220 respectively.

Referring to FIGS. 10 and 11, first assist handle 222 may be mounted to first base surface 218 through a first hinge member 230 and second assist handle 224 may be mounted to second base surface 220 through a second hinge member 232. In this manner, first assist handle 222 and second assist handle 224 may pivot between a stowed configuration, FIG. 10, and a deployed configuration, FIG. 11. In the stowed configuration, first assist handle 222 and second assist handle 224 are nested within corresponding ones of first recess 214 and second recess 216.

At this point, it should be understood that the non-limiting examples described herein present headrest and seat back mounted assist handles that allow passengers a readily accessible gripping structure to aid in egress of a vehicle. The handles are mounted to internal supports that provide interface that ensures and/or promotes a longer service life by reducing stresses on headrest and seatback surfaces not previously designed to be used as egress assist aids. At this point, it should be understood that while described as including a depth of pocket dimension that is sized to provide a positive gripping structure for hand and/or fingers of a passenger, the dimensions of the recess may vary. That is the recesses may be larger or smaller than those shown and can include a simple shallow depression or scallop having a minimal depth of pocket.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seat component for a vehicle comprising:
a body having a first surface, a second surface opposite the first surface, a first side surface, and a second side surface, the first side surface and the second side surface extending between and connecting the first surface and the second surface;
a recess formed in one of the first side surface and the second side surface; and
an assist handle secured to the seat component at the recess,
wherein the recess includes a base surface surrounded by a perimetrical surface including an upper surface portion, a lower surface portion, a first side surface portion, and a second side surface portion, the assist handle being fixedly connected to the perimetrical surface, and
wherein the assist handle includes a first end extending through the upper surface portion and a second end extending through the base surface.

2. The seat component according to claim 1, wherein the recess includes a perimetrical surface element defining the assist handle.

3. The seat component according to claim 2, wherein the recess includes a first recess including a first perimetrical surface element mounted in the first side surface and a second recess including a second perimetrical surface element mounted in the second side surface, the first perimetrical surface element forming a first assist handle and the second perimetrical surface element forming a second assist handle.

4. The seat component according to claim 3, wherein the first assist handle is fixedly connected to the second assist handle through the body.

5. The seat component according to claim 1, wherein the recess includes a base surface surrounded by a perimetrical surface including an upper surface portion, a lower surface portion, a first side surface portion, and a second side surface portion, the assist handle being connected to the base surface.

6. The seat component according to claim 1, wherein the body defines a headrest.

7. A vehicle comprising:
a vehicle body defining a passenger compartment; and
a seat arranged in the passenger compartment, the seat including the seat component according to claim 1.

8. The vehicle according to claim 7, wherein the recess includes a perimetrical surface element defining the assist handle.

9. The vehicle according to claim 8, wherein the recess includes a first recess including a first perimetrical surface element mounted in the first side surface and a second recess including a second perimetrical surface element mounted in the second side surface, the first perimetrical surface element forming a first assist handle and the second perimetrical surface element forming a second assist handle.

10. The vehicle according to claim 9, wherein the first assist handle is fixedly connected to the second assist handle through the body.

11. The vehicle according to claim 7, wherein the recess includes a base surface surrounded by a perimetrical surface including an upper surface portion, a lower surface portion, a first side surface portion, and a second side surface portion, the assist handle being connected to the base surface.

12. The vehicle according to claim 7, wherein the seat component defines a headrest.

13. A seat component for a vehicle comprising:
a body having a first surface, a second surface opposite the first surface, a first side surface, and a second side surface, the first side surface and the second side surface extending between and connecting the first surface and the second surface;
a recess formed in one of the first side surface and the second side surface; and
an assist handle secured to the seat component at the recess,
wherein the recess includes a base surface surrounded by a perimetrical surface including an upper surface portion, a lower surface portion, a first side surface portion, and a second side surface portion, the assist handle being fixedly connected to the perimetrical surface, and
wherein the assist handle is spaced from the base surface, the first side surface portion, and the second side surface portion.

14. The seat component according to claim 13, wherein the recess includes a base surface surrounded by a perimetrical surface including an upper surface portion, a lower surface portion, a first side surface portion, and a second side surface portion, the assist handle being fixedly connected to the perimetrical surface.

15. The seat component according to claim 14, wherein the assist handle includes a first end extending through the upper surface portion and a second end extending through the base surface.

16. A vehicle comprising:
a vehicle body defining a passenger compartment; and
a seat arranged in the passenger compartment, the seat including the seat component according to claim 13.

17. The vehicle according to claim 12, wherein the recess includes a base surface surrounded by a perimetrical surface including an upper surface portion, a lower surface portion, a first side surface portion, and a second side surface portion, the assist handle being fixedly connected to the perimetrical surface.

18. The vehicle according to claim 13, wherein the assist handle includes a first end extending through the upper surface portion and a second end extending through the base surface.

19. A seat component for a vehicle comprising:
a body having a first surface, a second surface opposite the first surface, a first side surface, and a second side surface, the first side surface and the second side surface extending between and connecting the first surface and the second surface;
a recess formed in one of the first side surface and the second side surface; and
an assist handle secured to the seat component at the recess,
wherein the recess includes a base surface surrounded by a perimetrical surface including an upper surface portion, a lower surface portion, a first side surface portion, and a second side surface portion, the assist handle being connected to the base surface, and
wherein the assist handle is pivotally mounted to the base surface.

20. A vehicle comprising:
a vehicle body defining a passenger compartment; and a seat arranged in the passenger compartment, the seat including the seat component according to claim 19.

* * * * *